United States Patent
Im

(10) Patent No.: US 7,155,544 B2
(45) Date of Patent: Dec. 26, 2006

(54) PORTABLE INFORMATION DEVICE CAPABLE OF PROCESSING INPUT DATA FROM EXTERNAL DEVICE AND METHOD THEREOF

(75) Inventor: Sung-bin Im, Seoul (KR)

(73) Assignee: Samsung Electronics Co., Ltd., Gyunggi-do (KR)

( * ) Notice: Subject to any disclaimer, the term of this patent is extended or adjusted under 35 U.S.C. 154(b) by 0 days.

(21) Appl. No.: 10/404,332

(22) Filed: Apr. 2, 2003

(65) Prior Publication Data
US 2003/0236088 A1 Dec. 25, 2003

(30) Foreign Application Priority Data
Jun. 15, 2002 (KR) ............................... 2002-33495

(51) Int. Cl.
*G06F 3/023* (2006.01)
*G06F 13/14* (2006.01)

(52) U.S. Cl. .............................. 710/67; 710/62; 710/65

(58) Field of Classification Search ................ 345/169, 345/173; 341/22, 26; 708/140; 710/62, 710/65, 67
See application file for complete search history.

(56) References Cited

U.S. PATENT DOCUMENTS

| | | | |
|---|---|---|---|
| 5,387,042 A | | 2/1995 | Brown |
| 5,450,078 A | * | 9/1995 | Silva et al. ................... 341/22 |
| 5,576,981 A | * | 11/1996 | Parker et al. ............... 708/140 |
| 5,623,261 A | * | 4/1997 | Rose ............................ 341/26 |
| 6,281,886 B1 | * | 8/2001 | Ranieri ....................... 345/173 |
| 6,429,793 B1 | * | 8/2002 | Paolini ......................... 341/22 |
| 6,867,965 B1 | * | 3/2005 | Khoo ......................... 361/686 |
| 2003/0107555 A1 | * | 6/2003 | Williams .................... 345/169 |
| 2004/0012508 A1 | * | 1/2004 | Wolfson et al. .............. 341/22 |

FOREIGN PATENT DOCUMENTS

| | | |
|---|---|---|
| CN | 1412650 A | 4/2003 |
| EP | 1 077 415 A1 | 2/2001 |
| JP | 64-057361 | 3/1989 |
| JP | 08-016293 | 1/1996 |
| JP | 2002-157066 | 5/2002 |
| WO | WO 99/49394 A1 | 9/1999 |

OTHER PUBLICATIONS

Yuki Koji, Information Termial System, May 31, 2005, Japanese Patent Office, machine translation.*
CN Abstract No. 1414451, dated Apr. 30, 2003.

* cited by examiner

*Primary Examiner*—Kim Huynh
*Assistant Examiner*—Joshua D. Schneider
(74) *Attorney, Agent, or Firm*—Sughrue Mion, PLLC

(57) ABSTRACT

A portable information device capable of processing data input from an external device and a method thereof. The portable information device has an interfacing unit in connection with the external device for receiving an input of key data therefrom, and a key code converting unit for converting the input key data into key code values that can be input to the portable information device. As a user can input data through a keypad of a mobile telephone with which he/she is familiar, the user can input data with speed and convenience.

19 Claims, 3 Drawing Sheets

PORTABLE INFORMATION DEVICE CAPABLE OF PROCESSING INPUT DATA FROM EXTERNAL DEVICE AND METHOD THEREOF

BACKGROUND OF THE INVENTION

1. Field of the Invention

The present invention generally relates to a portable information device and input data processing thereof, and more particularly, it relates to a portable information device capable of receiving key data from an external device such as a mobile phone and processing the input key data. The present Application claims priority from Korean Patent Application No. 2002-0033495, filed on Jun. 15, 2002, which is incorporated in full herein by reference.

2. Description of the Prior Art

Recent development of digital technology has brought a flourish of portable information devices such as mobile phones, Personal Digital Assistants (PDA), organizers and laptop computers. Among these, the PDA has almost become an essential tool for the people of the information era. The PDA is a compact and portable personal terminal that offers functions such as personal information management and communications. In addition to functioning as a mobile phone, the PDA allows the user to download information such as e-mail and stock prices in real-time.

Generally, the PDA is constructed of a compact touch screen, for example, 3 inches×5 inches large, with a separate soft keyboard program executed on the touch screen. In this conventional PDA, the user inputs the keys with a stylus pen. As the displayed keyboard screen is small and input speed is slow, the user has to wait. Also, there is a high possibility of incorrect input.

Further, because the soft keyboard covers the program on display, it is inconvenient for the user. Furthermore, it takes video memory and CPU resources to drive the soft keyboard program during input process.

In an attempt to solve the above-mentioned problems, an external removable keyboard device has been suggested for key input.

However, most removable keyboards in current use are made in a serial method, which does not basically support for Plug and Play (PnP). Accordingly, re-booting is required for the PDA to recognize the keyboard. Besides, the user needs to carry the keyboard which is quite burdensome.

SUMMARY OF THE INVENTION

Accordingly, the goal of the present invention is to provide a portable information device and processing method, which is capable of receiving input of a user via a user's own mobile phone with which he/she is familiar, omitting a requirement for a separate device for data input and enabling the user to input data with ease, and also capable of processing the input data received from such external device.

The above object is accomplished by a portable information device having an interface unit connectible to an external device according to the present invention, including a plurality of key mapping tables that store key data of an external device having a key code generation system that is different from that of the portable information device, the mapping tables configured to map key data of the external device to key code values of the portable information device; a key code discriminating unit, configured to check, upon connection of the portable information device with the external device via the interfacing unit, whether there exists a suitable key mapping table of said plurality of key mapping tables corresponding to the external device; and a key code converting unit configured to convert the key data input from the external device into a key code value of the portable information device, wherein the converting of the suitable key data is performed by using the key mapping table.

The key data of the external device are stored in the key mapping tables by categories of product types. Specifically, the key data of the external device are stored in the key mapping tables by at least one of categories of manufacturers and type of chip into the external device.

The key code values converted by the key code converting unit are recognized as one of text input codes and function codes.

When the code values converted by the key code converting unit are the text input codes, text keys from the external device are input.

When the code values converted by the key code converting unit are the function codes, a function corresponding to the function keys input from the external device is performed.

When the code values converted by the key code converting unit are Korean codes of the text input codes, the key code converting unit further comprises a text combining unit configured to determine the key code values output through the suitable key mapping table as an initial sound, or a vowel, or a final consonant, and combining the determined sounds.

The interface unit is a USB interface, and the external device is preferably a mobile phone.

Another object is accomplished by a method for inputting data to a portable information device using a keypad of an external device according to the present invention, including the steps of mapping key data of an external device having a key code generation system that is different from that of the portable information device in accordance with key code values of the portable information device, and storing the mapped data therein; checking whether there exists a key mapping table corresponding to the external device, when the portable information device is connected with the external device via the interfacing unit; and converting the key data input from the external device in accordance with the key mapping table, and outputting as key code values of the portable information device.

The code values converted by the key code converting unit are recognized either as text input codes or function codes.

BRIEF DESCRIPTION OF THE DRAWINGS

The above-mentioned object and the feature of the present invention will be more apparent by describing the preferred embodiment of the present invention by referring to the appended drawing, in which.

DETAILED DESCRIPTION OF THE PREFERRED EMBODIMENT

From now on, the present invention will be described in greater detail by referring to the appended drawings.

Figure 1:
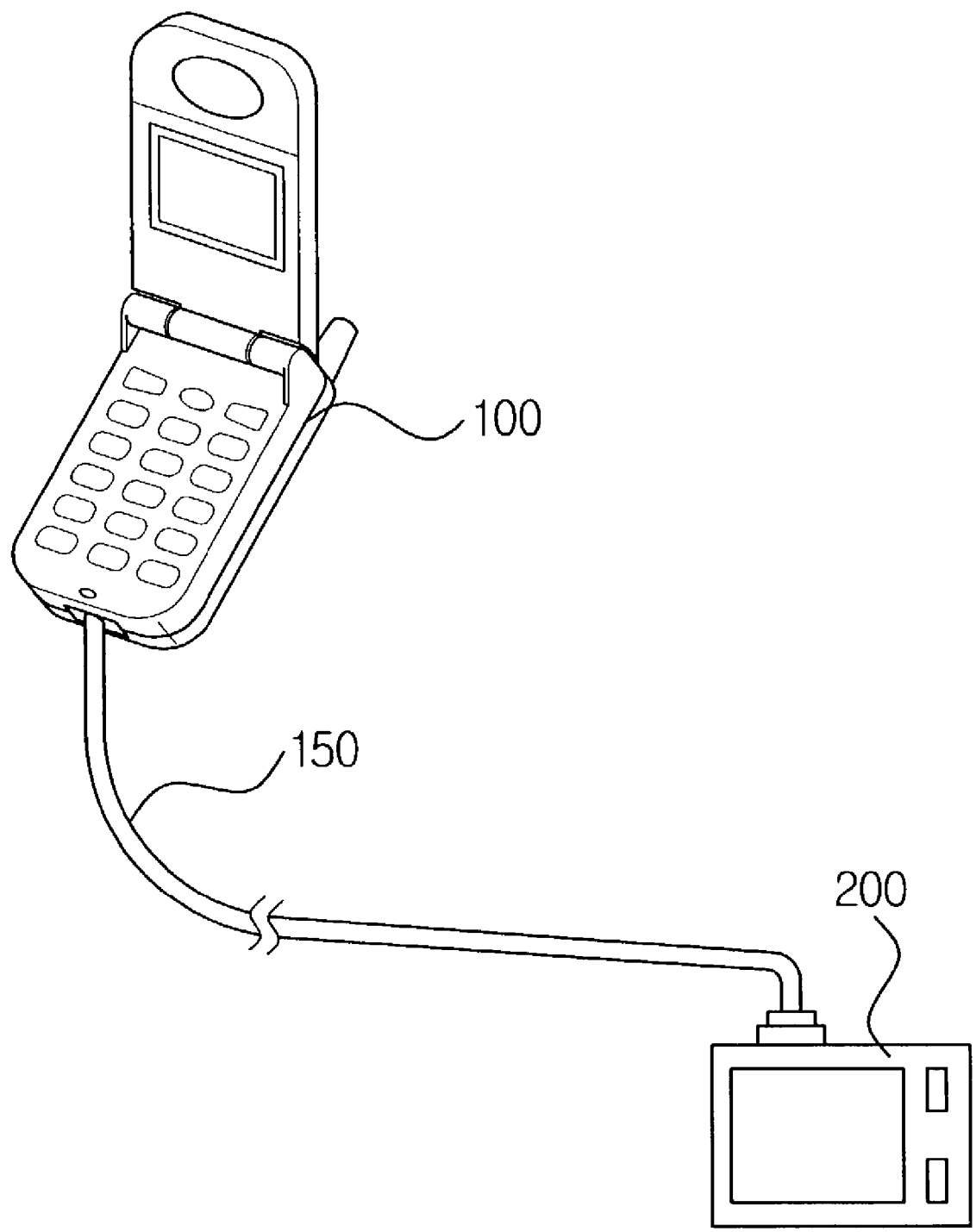
FIG. 1 is a view showing a portable information device according to the preferred embodiment of the present invention being connected with an external device via a USB cable.

FIG. 1 shows the portable information device according to the preferred embodiment of the present invention being connected with an external device through a USB cable.

Referring to FIG. 1, the portable information device 200 is connected to the external device 100 through the USB cable 150.

In FIG. 1, a mobile phone is employed as the external device 100, while a Personal Digital Assistant (PDA) is used as the portable information device 200.

Upon connection of the external device 100 with the portable information device 200 through the USB cable 150, the portable information device 200 reads descriptor information from the external device 100 through the USB enumeration, thereby the portable information device 200 confirms the information about the manufacturer and device, etc. of the external device 100.

The USB cable 150 is connected to the external device 100, and thus it transmits the key data output from the external device 100 to the portable information device 200 connected thereto. For the USB cable 150, it is preferred that a connector appropriate for the portable information device 200 and the external device 100 is used. When the external device 100 is embodied as a mobile phone, it is appropriate to use a USB data transmission cable. However, it will be understood by those of ordinary skill in the art that other devices suitable to carry out the purposes of the invention may be used in addition to the mobile telephone of the present embodiment.

Figure 2:
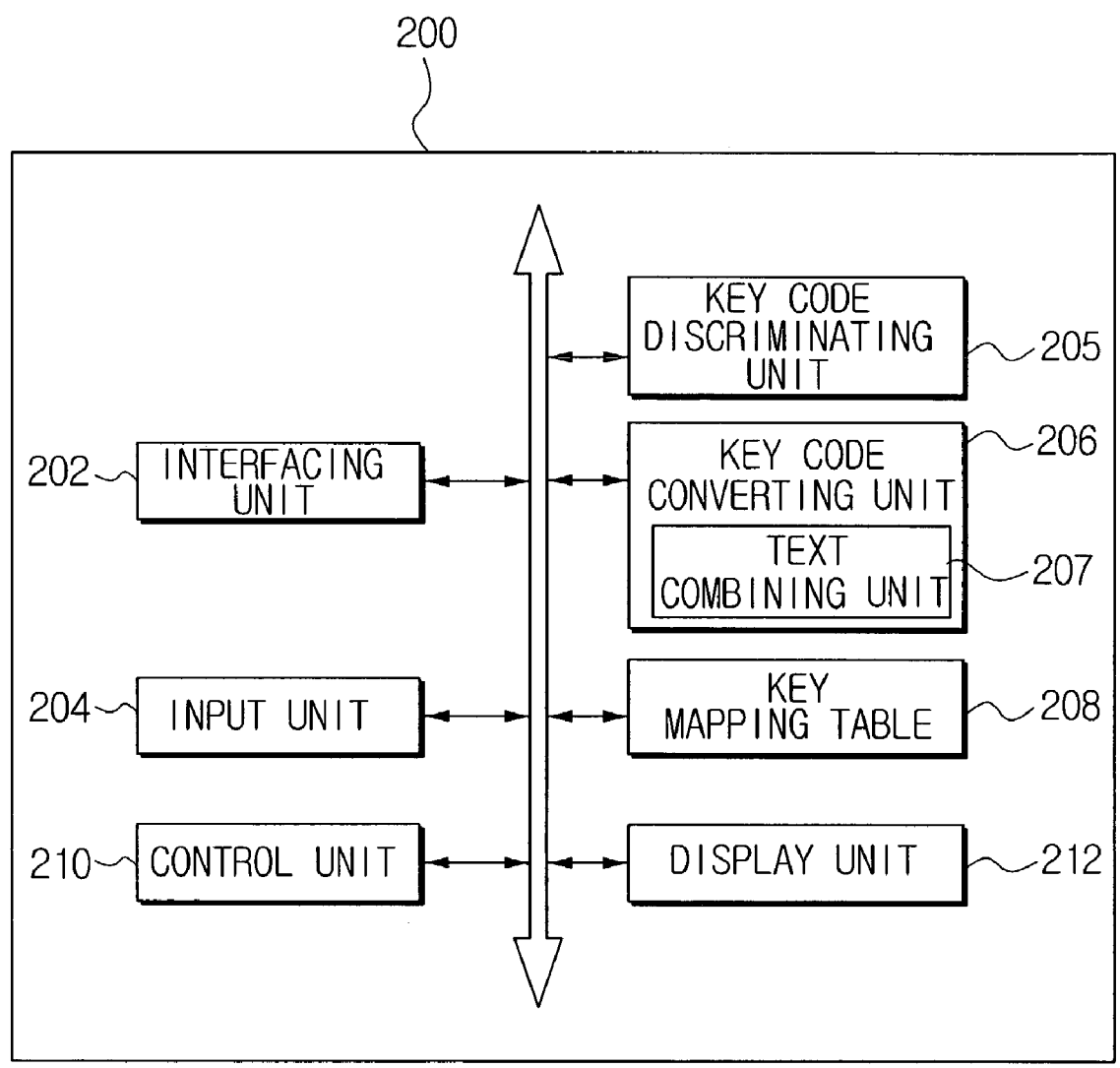
FIG. 2 is a block diagram showing in detail construction of a PDA applied to the portable information device of FIG. 1.

FIG. 2 is a block diagram showing in detail construction of the PDA applied to the portable information device.

Referring to FIG. 2, the PDA 200 according to the present invention includes an interfacing unit 202, an input unit 204, a key code discrimination unit 205, a key code converting unit 206, a text combining unit 207, a key mapping table 208, a control unit 210 and a display unit 212.

The input unit 204 is comprised of a key panel or a touch panel, which has various function keys such as numeral keys, direction keys, a confirmation key, etc. The input unit 204 outputs to the control unit 210 the input signals according to the user's text input and function key's selection. The display unit 212 displays the text data that are input in accordance with the control signal of the control unit 210, and also displays the moving and selecting on menu bars or by other suitable display means.

The interfacing unit 202 is preferably used with a USB interface. Since the USB interface supports PnP, there is no need to re-boot the PDA 200 when it is connected with the mobile phone through the interfacing unit 202.

The interfacing unit 202 receives the key data that are input from the mobile phone connected via the USB cable 150. The interfacing unit 202 transmits the received key data to a buffer, and the transmitted key data is stored in the buffer (not shown).

The mobile phone and the PDA 200 have different key code generation systems from each other. Hence, the key data input from the mobile phone and a mapped key code value of PDA 200 are stored in the key mapping table 208. The respective key data is stored in the key mapping table 208 by categories of the key code generation systems.

Namely the key data is stored in the key mapping table 208 in the categories of items such as wireless chip type built into the mobile phone (e.g., CDMA type, GSM type), or manufacturer of the mobile phone.

Preferably, the key mapping table 208 is stored in flash ROM for performing upgrades when necessary. Table 1 below shows one example of the key mapping table 208 in respect to a certain device, which is stored in the key mapping table 208.

TABLE 1

| Text key/function key | Input key data | Converted key data |
| --- | --- | --- |
| ㄱ | 0 × FF00 | 0 × AAF0 |
| ㄴ | 0 × FF01 | 0 × AAF1 |
| ... | ... | ... |
| ㅏ | 0 × FFB0 | 0 × AAE0 |
| ㅑ | 0 × FFB1 | 0 × AAE1 |
| ... | ... | ... |
| A | 0 × FFE0 | 0 × 00A0 |
| B | 0 × FFE1 | 0 × 00A1 |
| ... | ... | ... |
| 0 | 0 × 0000 | 0 × 00C0 |
| 1 | 0 × 0001 | 0 × 00C1 |
| ... | ... | ... |
| ↑ | 0 × AA01 | 0 × FF01 |
| ↓ | 0 × AA02 | 0 × FF02 |
| ← | 0 × AA03 | 0 × FF03 |
| → | 0 × AA04 | 0 × FF04 |
| ... | ... | ... |

The control unit 210 controls general operation of the PDA 200 in accordance with the input signal from the input unit 202.

The key code discriminating unit 205, upon connection of the mobile phone with the PDA 200 via the interfacing unit 202, checks whether there exists a key mapping table 208 corresponding to the external device.

When the key data are input from the mobile phone, the key code converting unit 206 converts the key code values corresponding to the input key data in accordance with the key mapping table 208, and outputs the converted data to the control unit 210.

For this, the key code converting unit 206 discriminates the generation system of the input key data that are received from the mobile phone via the interfacing unit 202, and checks whether there exists a key mapping table 208 corresponding to generation system of the input key data. When there is the key mapping table 208 corresponding to the generation system of the input key data, the key code converting unit 206 converts the input key data to the key data value of PDA 200 in accordance with the corresponding key mapping table 208, and outputs the key code values.

Further, the key code converting unit 206 determines a type of the respective text code in accordance with the type of the input key data, such as whether the input key data are for text input code or moving/selection code of the menu bar, and processes the data accordingly.

In the case of the text input codes, it is determined whether the input key data are in Korean code or English code or in some other alphabet or language. If the input key data are in Korean codes, the text combining unit 207 determines whether each input key code value is an initial sound, or a vowel, or a final consonant, and combines the key code values accordingly.

The code conversion by the key code converting unit 206 will be described below referring to an example.

When the keypads of the mobile phone indicating "ㄱ", "ㅏ", "A" are pressed, key codes corresponding to the pressed keypads are generated.

Here, the key codes vary according to the type of chips built in the mobile phone, or the manufacturer of the mobile phone.

For example, the key data respectively of ㄱ:0xFF00, ㅏ:0xFFB0, A:0x00E0, are input to the portable information device, in this case a PDA, via the USB cable.

The key code discriminating unit 205 searches the key mapping table 208 corresponding to the type of the mobile phone. The type of the mobile phone is recognized during the USB enumeration. The key code converting unit 206 converts the input key data into key data recognizable by the PDA 200. If the key data are in Korean codes, the key data are combined at a text combining module as a complete Korean syllable.

For example, "0xAAF0" and "0xAAE0" are combined into the Korean syllable '가'.

The text code are input to the control unit 210, and displayed at the display unit 212.

For example, a Korean syllable "가" and a letter "A" of the Roman alphabet are output.

Figure 3:
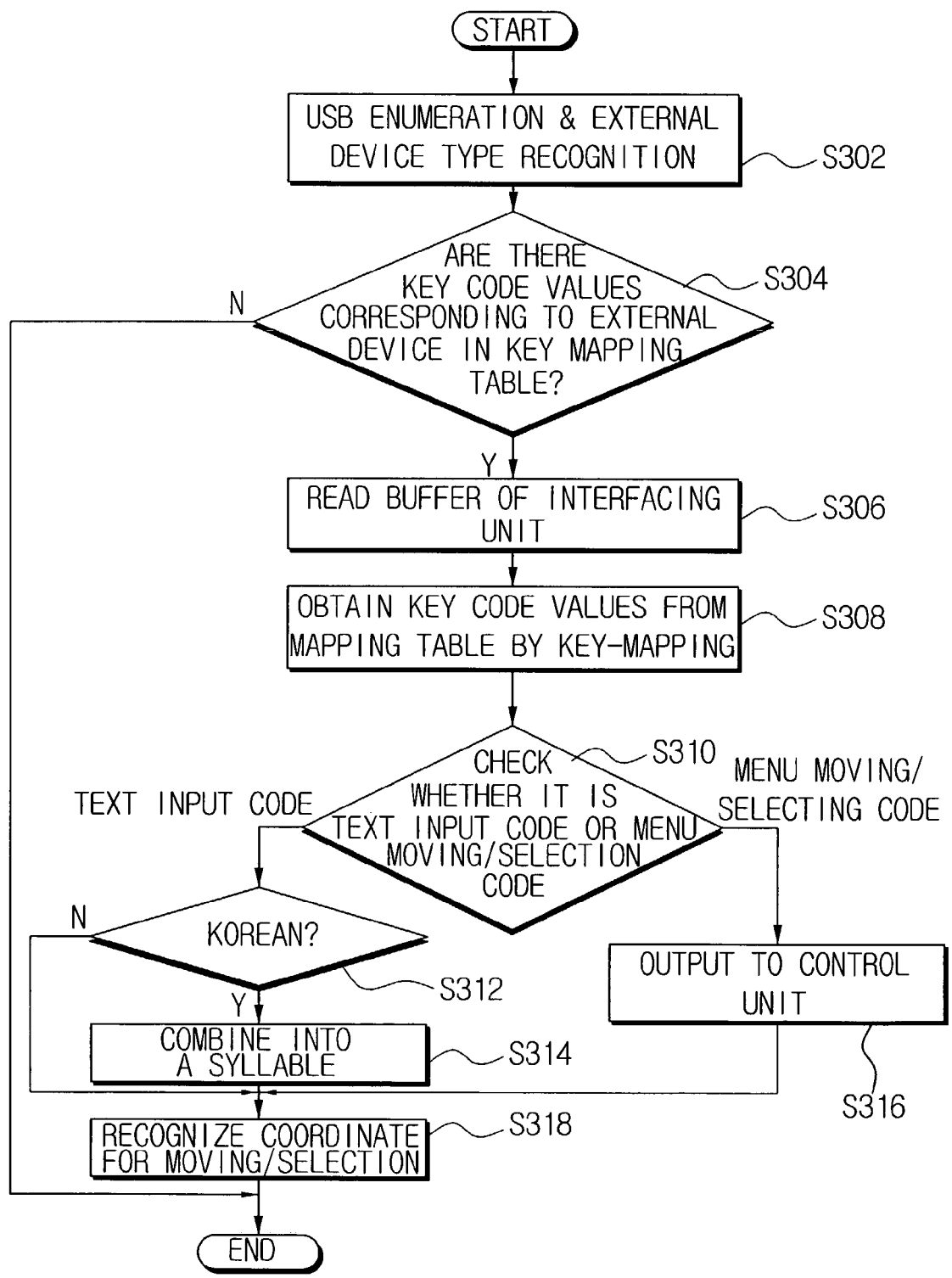
FIG. 3 is a flowchart showing the PDA of FIG. 2 processing the external input data.

FIG. 3 is a flowchart showing the process in which the PDA of FIG. 2 processes external input.

Referring to FIG. 3, the type of external device is recognized during the USB enumeration (step S302).

Next, it is confirmed whether the key code values corresponding to the recognized external device are stored in the key mapping table or not (step S304).

Then, the buffer of the interfacing unit 202 is read (step S306).

The input key code values are searched in the key mapping table and output (step S308).

The searched code values are inspected, and it is checked whether the code values are text code or menu moving/selection code (step S310).

If the searched code values are text codes, the code values are inspected to determine whether they are in Korean codes or English codes (step S312).

If the code values are in Korean codes, the code values are combined as a complete Korean syllable (step S314).

Then the key code values are output to the control unit 210 (step S316).

If the searched code values are menu moving/selection codes, a corresponding coordinate for control purpose is recognized. Then the coordinate is output to the control unit 210 for moving and selection on the menu bar (step S318).

With the portable information device capable of processing input data from an external device and a processing method thereof according to the present invention, key data can be input from the external device, and according to the type of the input key data, not only a general text input function, but also the function of moving and selection on the menu bar can be used.

Further, since the user uses the keypad of his/her own mobile phone or another such device with which he/she is quite familiar, it takes relatively short time to input data, while there is little possibility that the user will input data incorrectly. This is a convenience to the user.

Further, compared to the conventional case that uses the soft keyboard program executed on the PDA screen, much video memory and CPU resources can be saved.

Although the preferred embodiment of the present invention has been described, it will be understood by those skilled in the art that the present invention should not be limited to the described preferred embodiment, but various changes and modifications can be made within the spirit and scope of the present invention as defined by the appended claims.

What is claimed is:

1. A portable information device having an interface unit connectable to an external device, comprising:
   a plurality of key mapping tables that store key data of an external device having a key code generation system that is different from that of the portable information device, the mapping tables configured to map key data of the external device to key code values of the portable information device;
   a key code discriminating unit, configured to check, upon connection of the portable information device with the external device via the interface unit, whether there exists a suitable key mapping table of said plurality of key mapping tables corresponding to the external device; and
   a key code converting unit configured to convert the key data input from the external device into a key code value of the portable information device, wherein the converting of the key data is performed by using the suitable key mapping table.

2. The portable information device of claim 1, wherein the key data of the external device are stored in the key mapping tables by categories of product types.

3. The portable information device of claim 2, wherein the key data of the external device are stored in the key mapping tables by at least one of categories of manufacturers and type of chip in the external device.

4. The portable information device of claim 3, wherein the key code values converted by the key code converting unit are recognized as one of text input codes and function codes.

5. The portable information device of claim 4, wherein, when the code values converted by the key code converting unit are the text input codes, text keys from the external device are input.

6. The portable information device of claim 4, wherein, when the code values converted by the key code converting unit are the function codes, a function corresponding to the function keys input from the external device is performed.

7. The portable information device of claim 5, wherein, when the code values converted by the key code converting unit are Korean codes of the text input codes, the key code converting unit further comprises a text combining unit configured to determine the key code values output through the suitable key mapping table as an initial sound, or a vowel, or a final consonant, and combining the determined sounds.

8. The portable information device of claim 1, wherein the interface unit is a USB interface.

9. The portable information device of claim 1, wherein the external device is a mobile phone.

10. A method for inputting data to a portable information device using a keypad of an external device, comprising:
   mapping key data of an external device having a key code generation system that is different from that of the portable information device in accordance with key code values of the portable information device, and storing the mapped data in a key mapping table of the portable information device;
   checking whether there exists the key mapping table corresponding to the external device, upon connection of the portable information device with the external device via an interfacing unit; and converting the key data input from the external device in accordance with the key mapping table, and outputting key code values of the portable information device.

11. The portable information device of claim 10, wherein the code values converted by the key code converting unit are recognized as one of text input codes and function codes.

12. A personal digital assistant (PDA) having an interface unit operable to communicate with a mobile phone, comprising:
- a plurality of key mapping tables that store key data of said mobile phone having a key code generation system that is different from that of the PDA, the mapping tables configured to map key data of the mobile phone to key code values of the PDA;
- a key code discriminating unit, configured to check, upon communication between the PDA and the mobile phone via the interface unit, whether there exists a suitable key mapping table of said plurality of key mapping tables corresponding to the mobile phone; and
- a key code converting unit configured to convert the key data input from the mobile phone into a key code value of the PDA, wherein the converting of the key data is performed by using the suitable key mapping table.

13. The PDA of claim 12, wherein the key data of the mobile phone are stored in the key mapping tables by categories of product types.

14. The PDA of claim 13, wherein the key data of the mobile phone are stored in the key mapping tables by at least one of categories of manufacturers and type of chip in the mobile phone.

15. The PDA of claim 14, wherein the key code values converted by the key code converting unit are recognized as one of text input codes and function codes.

16. The PDA of claim 15, wherein, when the code values converted by the key code converting unit are the text input codes, text keys from the mobile phone are input.

17. The PDA of claim 15, wherein, when the code values converted by the key code converting unit are the function codes, a function corresponding to the function keys input from the mobile phone is performed.

18. The PDA of claim 16, wherein, when the code values converted by the key code converting unit are Korean codes of the text input codes, the key code converting unit further comprises a text combining unit configured to determine the key code values output through the suitable key mapping table as an initial sound, or a vowel, or a final consonant, and combining the determined sounds.

19. The PDA of claim 12, wherein the interface unit is a USB interface.

* * * * *